April 3, 1962

A. A. HIRSCH 3,027,586

EXTERNALLY CONTROLLED FOG WIPER FOR
LIQUID METER REGISTER GLASSES

Filed April 20, 1959

INVENTOR

*a. adler Hirsch*

United States Patent Office 3,027,586
Patented Apr. 3, 1962

3,027,586
EXTERNALLY CONTROLLED FOG WIPER FOR LIQUID METER REGISTER GLASSES
Abraham Adler Hirsch, 141 Norwood St., Shreveport, La.
Filed Apr. 20, 1959, Ser. No. 807,581
7 Claims. (Cl. 15—250)

The inside surfaces of the cover glasses of liquid meter registers, particularly water meters, frequently accumulate fog. Such deposits interfere with or completely prevent reading of the registers. Under such conditions, either the glass is broken, or the register hood is completely removed to permit visibility, both procedures being obviously objectionable and uneconomical.

Various devices have been proposed to solve the problem of condensate on meter glasses but all have some serious drawback, such as impaired field of view, the need for puncturing the register hood, the eventual freezing together of parts, the use of liquid filling fluid and other complications. The object of the present invention is to provide a defogging device for water meter registers and other apparatus subject to condensate interfering with visibility, that is simple, inexpensive, sure in operation, practically non-depreciating and which can be totally enclosed within the register hood and motivated externally. Further objects of my device are to provide for complete visibility of any part of the register dial or indices as desired, and to permit hermetically closing the top of the register case to form a pneumatic seal so as to prevent the entry of ground water or dirt which would damage the register clockwork.

Figure 1:
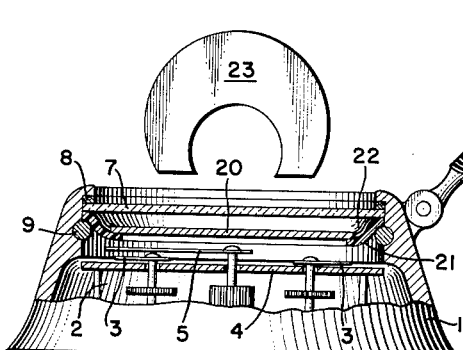
Figure 5:
Figure 6:
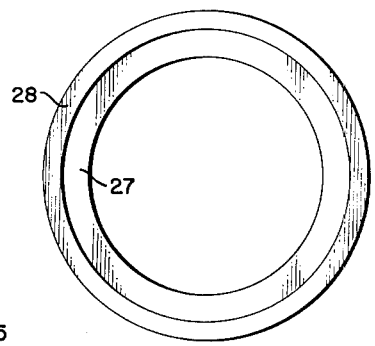
Figure 2:
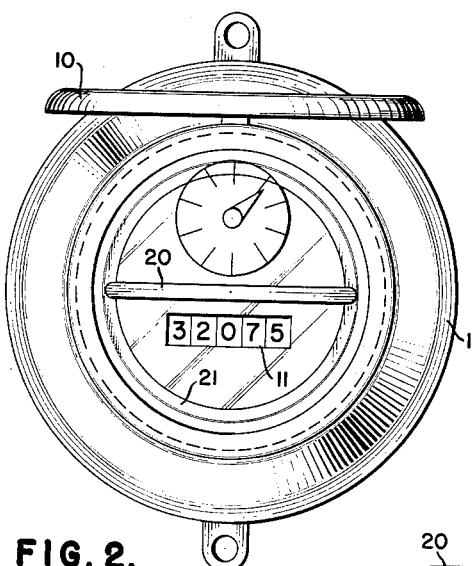
Figure 4:
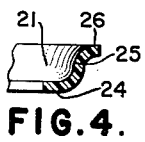
Figure 7:
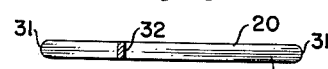
Figure 8:
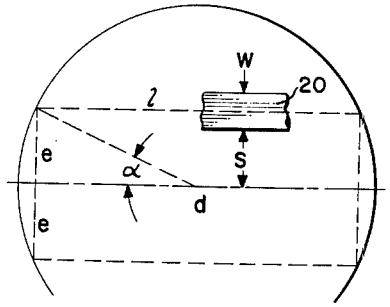
Figure 3:
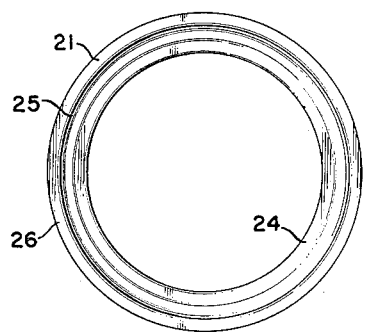

The desired objectives are accomplished by suspending a non-corrodible magnetic alloy bar freely on an annular transparent rest underneath the register cover glass. This bas is caused to rise and to contact the under surface of the register glass and rotate against it upon application and movement of an external magnet near the top surface of the cover glass. Construction and assembly of this device is illustrated in the accompanying drawings in which:

FIGURE 1 is a vertical section showing the defogging device applied to a typical round reading register head of a water meter, FIGURE 2 is a plan view of the defogging device applied to a straight reading cyclometer register in a water meter, FIGURE 3 is a plan view of the transparent plastic spacer and support for the magnetic wiper blade, FIGURE 4 is a section of the wiper support, FIGURE 5 is a section of an alternate construction of the wiper blade support with a wiper blade in place, FIGURE 6 is a plan view of the alternate construction of the wiper blade support, FIGURE 7 is a plan view of the wiper blade, FIGURE 8 is a diagram to show the space relations for the wiper blade within its support.

Figure 10:
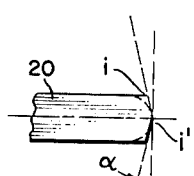
Figure 9:
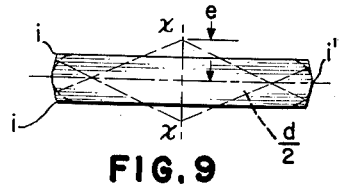

FIGURE 9 gives the geometry of the tip configuration to prevent possible wedging in the spacer ring of the support, and FIGURE 10 discloses another and simpler method for details of the wiper blade tip.

Identical parts bear the same number in all of the drawings.

Referring to FIGURE 1, the register case 1 of a water meter contains, for this example, a so-called round reading register clockwork assembly 2. Registration readings are taken from positions of accumulator hands 3 over dial plate 4. A sweep hand 5 is sometimes provided to permit observation of slow flows. Power to drive the register is obtained from upshaft 6. A cover glass 7 retained under gasket 8 by means of retainer spring 9 and a lid 10 complete the typical register head.

In order to perform externally controlled wiping action this invention adds a thin magnetic-type stainless steel wiper bar or blade 20, resting on an annular shelf or support 21 which is retained by spring 9 under cover glass 7. An externally applied permanent magnet 23 supplies force to attract bar 20 against cover glass 7. Sufficient space is allowed at the ends of bar 20 to permit it to shift off of a diametrical position, and thus enable a view of the whole dial plate as desired. Shelf 21 is preferably made of transparent plastic to allow readings underneath on the peripheral sweep hand scale.

In FIGURE 2 the bar 20 is supported on transparent shelf 21 over a so-called cyclometer type dial 11. The bar has been shifted eccentrically to allow complete visibility of the number wheels.

In FIGURES 3 and 4 the annular support 21 is formed into a horizontal shelf portion 24, a vertical offset or spacer segment 25 and a shoulder 26 for retention by means of spring 9. The offset is equal to the thickness of bar 20 plus a small clearance so as to keep bar 20 from contacting cover glass 7 except when actually in defogging operation.

FIGURE 5 shows an alternative choice for construction of the wiper support. Here a washer 27 is joined to an annular spacer 28. Bar 20 can then rest on washer 27 as a shelf; vertical play is allowed by spacer 28.

FIGURE 6 shows the plan view of elements 27 and 28 of the support described in FIGURE 5.

In FIGURE 7 bar 20 consists in plan of a straight segment 30 of magnetic type stainless steel with curved anti-wedging tips 31. Section 32 shows the bar as a thin rectangle for the purpose of preventing vertical rotation while sliding on shelf 24 or 27.

Experimental models have demonstrated the necessity of shaping the tips to prevent the wiper bar from sticking across the arc of contact with the plastic spacer.

Geometrical relations observed in determining the length of the wiper bar are shown in FIGURE 8 as follows:

The length $l$ of bar 20 is shorter than the internal diameter $d$ of offset 25 or washer 28 sufficiently to permit displacement of bar 20 laterally with respect to its long axis by an amount adequate to uncover the width of the centrally placed cyclometer numerals. Since cyclometer numerals are about ¼ inch in height, the eccentricity, $e$, between the diameter and the axis of the bar is $$e = \frac{1}{8}'' + \frac{1}{2} \text{ width of bar} \qquad (1)$$

By simple trigonometry $$\alpha = \text{arc sin} \frac{e}{d/2} \qquad (2)$$

hence the diametrical end play is given by $$(d-l) = d \text{ vers } \alpha \qquad (3)$$

As indicated in FIGURE 9, the curved tips 31 of FIGURE 7, are arcs of radius $d/2$ struck from centers $x$ at eccentricity distance, $e$, from the horizontal axis of the diagram. Where these arcs intersect at the axis of the bar and with its sides, the sharp corners are rounded off as at $i'$ and $i$. With a wiper bar so formed it is impossible to become stuck or locked in contact against spacer 28 or offset 25, since the arcs of contact are identical, giving an extended surface of contact and precluding pointwise wedging.

In FIGURE 10 linear simplification of the anti-wedging curvature at the tips of bar 20 is effected by tapering the ends to match the angle of contact of the axis of the bar with the arc of the spacer piece. The points at the corners and axis, respectively, of the bar are rounded off as stated previously, as at $i$ and $i'$. The value of the angle of contact $\alpha$ is given by the above Expression 2. The complement of this angle $(90° - \alpha)$ is used more conveniently in positioning the ends of the bar across an abrasive.

The method of mounting and using the defogging device as described in the preceding drawings is as follows: The wiper bar 20 is placed on the annular shelf 24 and the combination is lifted into the register case to seat underneath the cover glass 7. The retention spring 9 is then snapped into place. The register clockwork is positioned on the meter body and covered by the register case containing the wiper bar and shelf.

In operation to wipe clear any fog or droplets from underneath the cover glass a strong horse shoe magnet 23 is set on or slightly above the register glass 7 and rotated, thereby causing bar 20 to rise up against the moist undersurface of the register glass and rotatably follow the magnetic field. This motion of bar 20 against the glass 7 causes the fog or separate droplets to spread out as a thin, even film through which readings on the dial may be readily observed, the same as normal.

The scope of this invention is not limited by the specific figures cited nor by materials of construction. Other distances than 1/8" between edge of wiper bar and the axial diameter of the dial, and other shapes than circular registers and register boxes are within the scope of this specification. Other devices than water meters or liquid meters, subject to fogging or other interfering deposition, within the cover or observation port come within substance of this invention.

I claim:

1. In combination with a casing having a cover glass thereon a defogging wiper therefor consisting of a thin bar of magnetic alloy, a peripheral shelf disposed underneath said cover glass adapted to receive loosely said wiper bar at rest, a vertical spacer at the rim of said shelf to limit motion of said wiper bar and to provide clearance between said wiper bar and said cover glass said vertical spacer having a height slightly greater than the thickness of said wiper bar therefor, said shelf being retained in position by means of a spring pressing around the interior of said casing, said wiper bar rising in flat contact throughout its length against said cover glass and rotating and translating against same upon application of an external magnet and falling to rest on said peripheral shelf when said external magnet is removed.

2. A defogging wiper as in claim 1 in which the wiper bar is equal in length to a chord across the spacer ring at an offset from the center of the dial face sufficient to clear cyclometer numerals on said dial face.

3. A defogging wiper as in claim 1 in which the tips of said wiper bar are shaped as a pair of symmetrical intersecting arcs on each end of said wiper bar, the diameter of said arcs being equal to the inside diameter of the spacer ring and the center of said arc being displaced from the longitudinal axis of said wiper bar a distance equal to half the height of a cyclometer wheel numeral window, the intersections of said arcs with each other and with the sides of said wiper bar being rounded off.

4. A defogging wiper as in claim 1 in which the tips of said wiper bar are tapered on either side of its long axis to equal the complement of the angle of contact between said axis of said bar and the inner circle of the vertical spacer, intersections of the tapers so formed being rounded off.

5. A defogging wiper as in claim 1 in which the annular shelf consists of a shoulder to fit over the retaining spring of said cover glass, a vertical offset to provide clearance between said wiper bar and said cover glass, and an annular shoulder upon which ends of said wiper bar rest.

6. A defogging wiper as in claim 1 in which the annular shelf consists of a thick peripheral section to fit over the retainer spring of said cover glass and a thin annular section upon which said wiper bar rests, the outside diameter of said annular shelf being approximately equal to that of said cover glass, the inside diameter of said thick peripheral section being slightly greater than the length of said wiper bar, and the inside diameter of said thin annular shelf being slightly less than the length of said wiper bar.

7. In the device of claim 1 in which the peripheral shelf is made of transparent material.

References Cited in the file of this patent
UNITED STATES PATENTS

| | | |
|---|---|---|
| 2,206,006 | Hendrey | June 25, 1940 |
| 2,507,559 | D'Andrea | May 16, 1950 |
| 2,904,815 | Mitchell | Sept. 22, 1959 |